(12) United States Patent
Choi et al.

(10) Patent No.: US 7,564,246 B2
(45) Date of Patent: Jul. 21, 2009

(54) PRESSURE SENSOR USING FIELD EMISSION OF CARBON NANO-TUBE

(75) Inventors: In Mook Choi, Daejeon (KR); Sam Yong Woo, Daejeon (KR); Boo Shik Kim, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 392 days.

(21) Appl. No.: 11/472,742

(22) Filed: Jun. 22, 2006

(65) Prior Publication Data

US 2009/0072836 A1    Mar. 19, 2009

(30) Foreign Application Priority Data

Apr. 14, 2006    (KR) .................. 10-2006-0033812

(51) Int. Cl.
*G01L 21/30* (2006.01)
(52) U.S. Cl. ...................... 324/460; 324/459
(58) Field of Classification Search ................ 324/459, 324/460
See application file for complete search history.

(56) References Cited

U.S. PATENT DOCUMENTS 3,321,701 A * 5/1967 Crowell ....................... 324/460
7,276,844 B2 * 10/2007 Bouchard et al. ........... 313/310

OTHER PUBLICATIONS

Choi et al., Application of carbon nanotubes field mission effect to an ionization gauge, *American Institute of Physics*, 2005, pp. 3.
Choi et al., Vacuum measurement by carbon nonotubes field emission*, *American Vacuum Society*, 2006, pp. 1556-1559.

* cited by examiner

*Primary Examiner*—Vincent Q Nguyen
(74) *Attorney, Agent, or Firm*—Patterson, Thuente, Skaar & Christensen, P.A.

(57) ABSTRACT

Disclosed is an ion gage using a carbon nano-tube, more specifically a pressure sensor using a field emission of the carbon nano-tube. An array of carbon nano-tubes is formed on a metallic layer. A first grid is disposed on the array of the carbon nano-tubes. A second grid is disposed on the first grid in such a manner as to be spaced apart by a certain desired distance from the first grid. A collector is disposed on the second grid in such a manner as to be spaced apart by a certain desired distance from the second grid. Electrons emitted from the carbon nano-tube are collided with gas molecules to be ionized. The ionized cation is sensed by the collector to be outputted as an electrical signal.

12 Claims, 5 Drawing Sheets

PRESSURE SENSOR USING FIELD EMISSION OF CARBON NANO-TUBE

RELATED APPLICATION

This application claims the benefit of Korean Patent Application No. 10-2006-0033812, filed Apr. 14, 2006.

BACKGROUND OF THE INVENTION

1. Field of the Invention

The present invention relates to an ion gage using a carbon nano-tube, more specifically to a pressure sensor using the field emission of a carbon nano-tube.

2. Background of the Related Art

A pressure sensor (an ion gage), one of the typical sensor for measuring vacuum, is an essential gate used for measuring the environment of chambers in the semiconductor processing. It is of a great importance in the semiconductor processing to maintain a low pressure in a chamber and precisely measure the pressure since it is closely related to the composition of thin film and the characteristic of devices.

The pressure sensor used in the art of the invention does not utilize a classical pressure measuring method where a force exerted on a wall is measured, but measures the density of gas inside a chamber. Thermal electrons generated by means of a carbon nano-tube (hereinafter, referred to as a "CNT") are accelerated to ionize gas molecules inside the chamber, and the generated ions are detected to measure electric current, thereby enabling to measure the vacuum state.

FIG. 1 is a schematic sectional view, when in use, of a conventional pressure sensor using a carbon nano-tube. FIG. 2 is a partial enlarged view of the portion A in FIG. 1.

As shown in FIGS. 1 and 2, the pressure sensor includes a collector 20, a grid 12, and an electron emission source (CNT) 15 to thereby form a three-pole structure. For this purpose, a metallic layer 11 and the collector 20 are applied with voltages Vs, Vg that is lower than in the grid 12. The grid 12 is applied with a voltage Vc, which is higher than the metallic layer 11 and the collector 20. At this time, if the potential of the collector 20 is established to be lower than that of the grid 12, most thermal electrons ($e^-$) emitted from the CNT 15 are collided with gas molecules 16 to be ionized and then rapidly decelerated and returned to the grid 12. The ionized gas molecules become cations 19, which move towards the collector 20.

More specifically, cold electrons ($e^-$) are emitted from the tip of the CNT 15, which is electrically connected with the metallic layer 11. The emitted electrons ($e^-$) are accelerated towards the grid 12 by the electric field and pass the grid 12.

At this time, the density of gas molecules 16 is very dilute under vacuum environment. These gas molecules are distributed over a relatively long distance between the collector 20 and the grid 12. The electrons passing the grid 12 are collided with the gas molecules 16 to ionize them. During this course of action, cations 19 are generated. The generated cations 19 move to the collector 20 and are collected. That is, the cations 19 are rushed near the collector 20 to form ion current. The electrons emitted from the CNT 15 and the electrons separated from ion molecules are returned to the grid 12 again.

On the other hand, the generated ion current is discharged to the outside through the collector and amplified by an amplifier (not shown) to a measurable size. That is, the gas pressure is in proportion to the number of gas molecules. As the pressure increases, the number of gas molecules increase to thereby increase the probability of ionization, and thus the sensed ion current is increased proportionally.

However, the above conventional pressure sensor for measuring vacuum embraces the following problems. When the electrons emitted from the CNT 15 and the electrons separated from the ionized molecules are returned to the grid 12, they hit the grid 12, which may be damaged and heated up. Therefore, the CNT 15, disposed below the grid 12, is damaged. Consequently, it results in a degraded durability of the pressure sensor.

SUMMARY OF THE INVENTION

Therefore, the present invention has been made in view of the above problems occurring in the prior art, and it is an object of the present invention to provide a pressure sensor using a field emission of a carbon nano-tube, in which damage of CNT can be prevented to thereby improve the durability thereof.

To accomplish the above object, according to one aspect of the present invention, there is provided a pressure sensor using a field emission of a carbon nano-tube, comprising: an array of carbon nano-tubes formed on a metallic layer; a first grid disposed on the array of the carbon nano-tubes; a second grid disposed on the first grid in such a manner as to be spaced apart by a certain desired distance from the first grid; and a collector disposed on the second grid in such a manner as to be spaced apart by a certain desired distance from the second grid, wherein electrons emitted from the carbon nano-tube are collided with gas molecules to be ionized, and the ionized cation is sensed by the collector to be outputted as an electrical signal.

Preferably, a first grid voltage Vg, a second grid voltage Vg' and a collector voltage Vc are applied to the first grid, the second grid and the collector respectively so as to meet Vc<Vg<Vg'.

In addition, when the first grid voltage Vg is 200V, it is preferable that the second grid voltage Vg' is 220~270V and the collector voltage Vc is 80~100V.

The collector has a mesh structure.

In addition, the collector may have the form of a wire, and preferably a second grid may be further installed on the collector, the second grid being spaced apart by a desired distance from the collector.

The second grid, disposed above and below the collector, is applied with a same voltage Vg'. That is, it is preferable that the grid is integrally formed and the collector is disposed thereinside.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The preferred embodiments of the invention will be hereafter described in detail, with reference to the accompanying drawings.

First Embodiment

Figure 1:
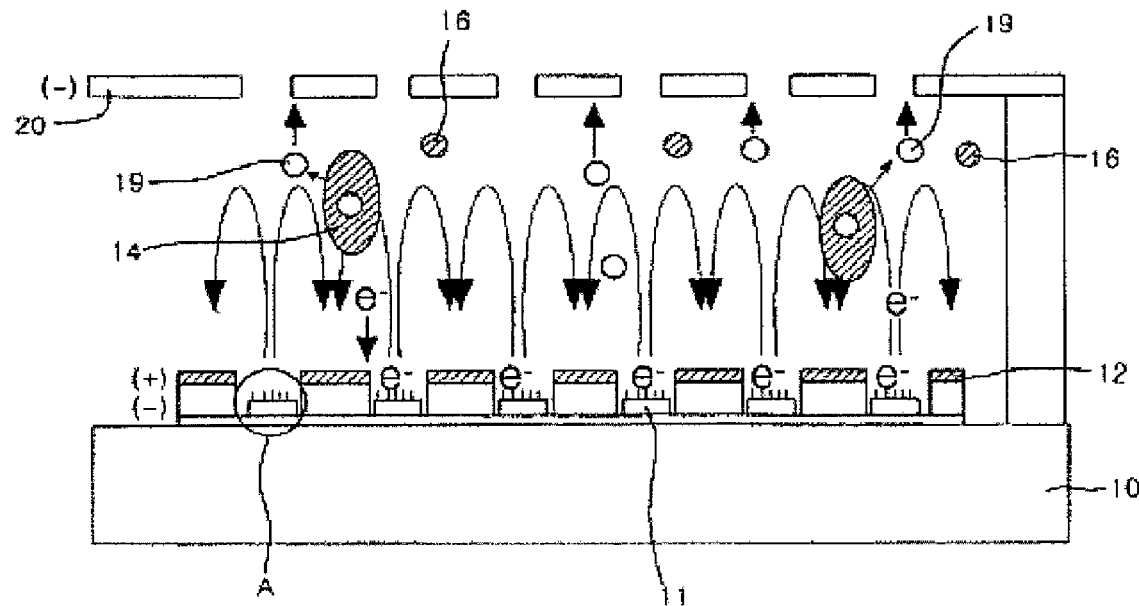
FIG. 1 is a schematic sectional view, when in use, of a conventional pressure sensor using a carbon nano-tube.
Figure 2:
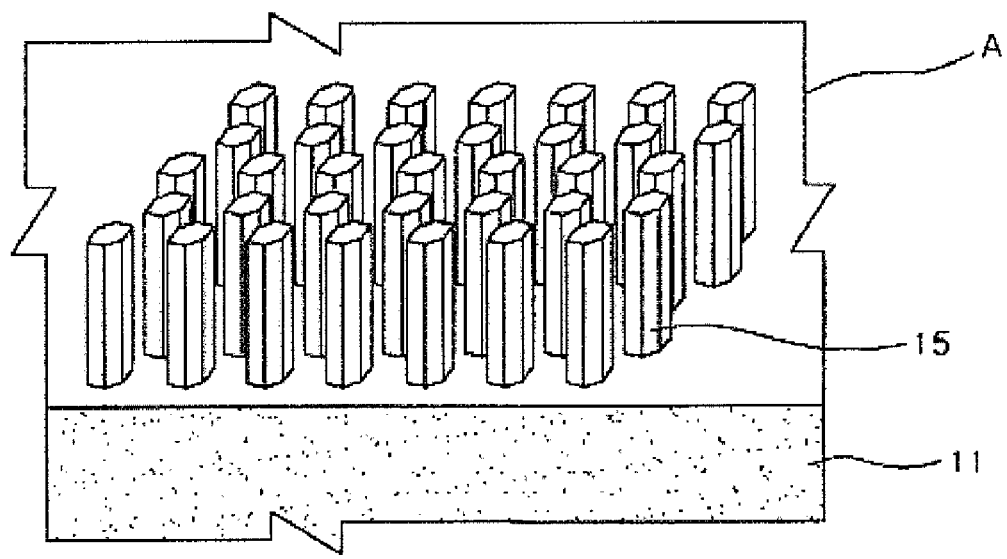
FIG. 2 is a partial enlarged view of the portion A in FIG. 1.
Figure 3:
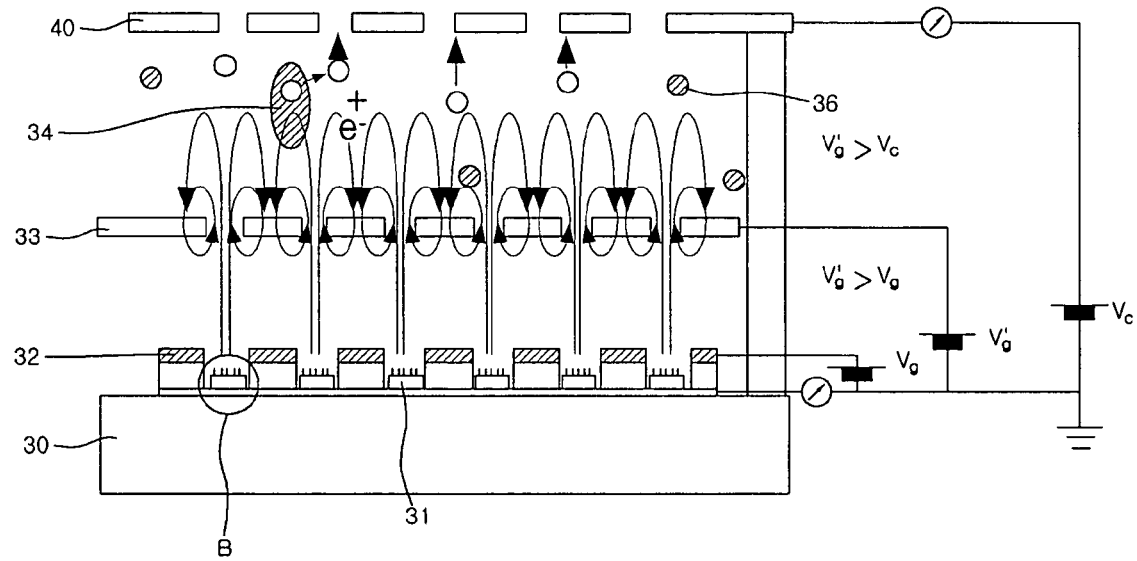
FIG. 3 is a schematic sectional view, when in use, of a pressure sensor using the field emission of a carbon nano-tube according to a first embodiment of the invention.
Figure 4:
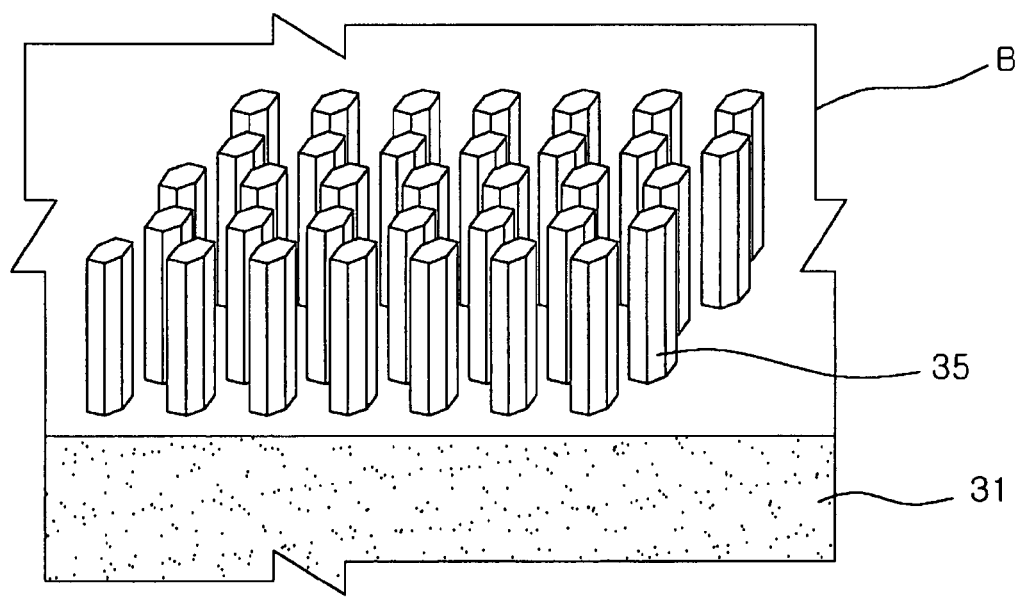
FIG. 4 is a partial enlarged perspective view of the portion B in FIG. 3.
Figure 5:
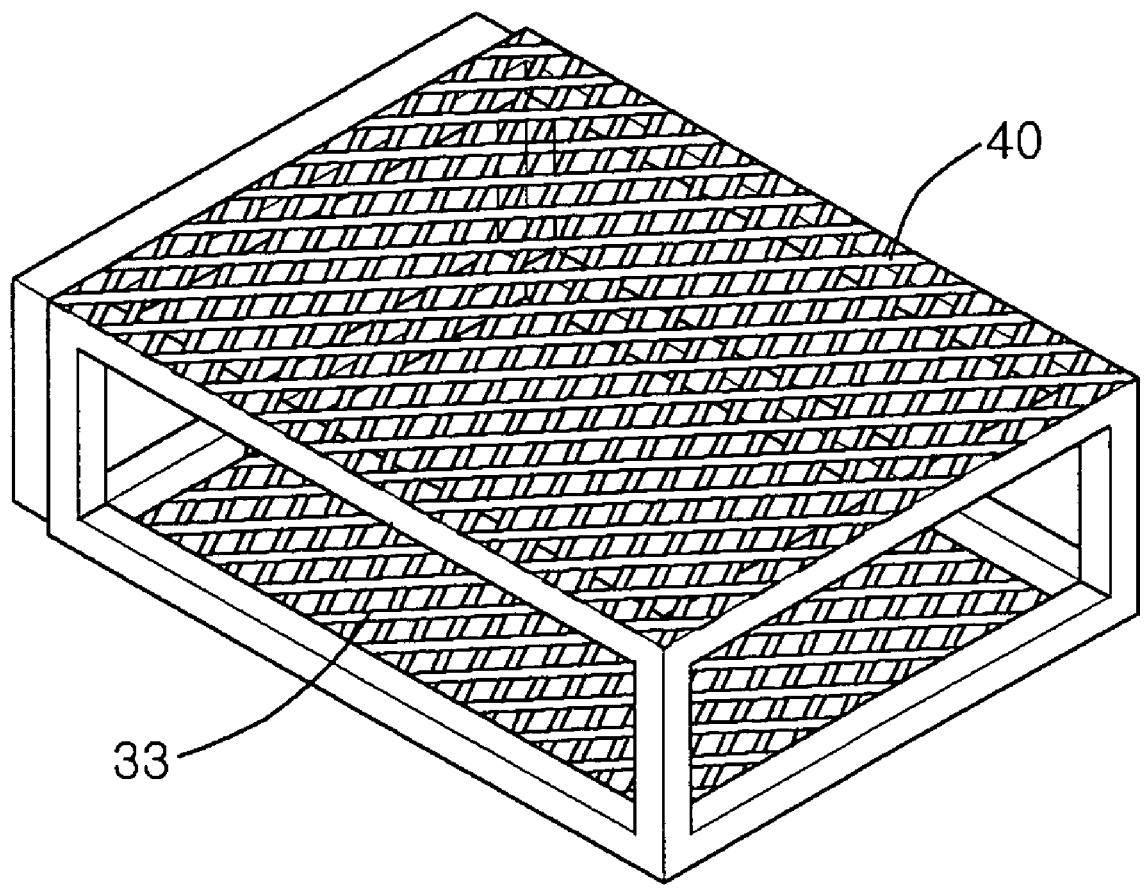
FIG. 5 is a perspective view of the pressure sensor of FIG. 3.

FIG. 3 is a schematic sectional view, when in use, of a pressure sensor using the field emission of a carbon nano-tube according to a first embodiment of the invention. FIG. 4 is a partial enlarged perspective view of the portion B in FIG. 3. FIG. 5 is a perspective view of the pressure sensor of FIG. 3. As illustrated in FIGS. 3 to 5, a CNT 35 has many advantages as an electron emitter due to a high aspect-ratio and a small radius of curvature at its tip. In the present invention, the CNT 35 array is formed through a screen printing technique.

For the purpose of vacuum measurement, the CNT 35 may be printed on a glass substrate 30, or the CNT may be directly grown on the glass substrate 30 through a thermal chemical vapor deposition method or a plasma enhanced chemical vapor deposition method. At this time, the grown area is 0.5 cm×0.5 cm~2 cm×2 cm, but may be varied to control the amount of current depending on the measurement range. In order to form a three-pole structure, not a two-pole structure, a CNT 35 array is formed, and thereafter a hole is machined on a glass substrate 30 having a thickness of 0.2 mm. Cr is vapor-deposited in a thickness of 100 nm to fabricate a first grid 32. Thereafter, the fabricated first grid 32 is arranged on the printed CNT 35 array. In case of using a thermal chemical vapor deposition method or a plasma enhanced chemical vapor deposition method, first an insulation film is installed on a metallic layer vapor-deposited with a catalytic metal such as Ni, Co, Fe or the like, and again a metallic grid is formed. After an electrode is formed, a CNT 35 can be grown to fabricate an electron emitter.

The second grid 33 is placed above the first grid 32 and may have a mesh structure or a wire structure. This second grid 33 is disposed between the first grid 32 and the collector 40.

Particularly, in FIG. 5, the second grid 33 and the collector 40 have a mesh structure where the mesh spacing is in a range of 1~3 mm. The collector 40 and the second grid 33 may have the same shape and configuration. Here, the collector may be formed in various ways, besides a mesh form. In addition, the distance between the first and second grids 32 and 33 is about 1 mm, and the distance between the second grid 33 and the collector 40 is 1~3 cm.

The first grid 32 is applied with a voltage Vg of about 200 V, and the second grid 33 is applied with a voltage Vg' of 220~270 V. The collector 40 is applied with a voltage Vc of 80~100 V. That is, the size of the applied voltages has a relation of Vc<Vg<Vg'. In case where a pressure is changed, the collector voltage Vc is set to be lower than the grid voltage Vg and Vg', thereby enabling to measure a change in the ionization current.

After ionization 34, separated electrons are directed toward the first grid 32. However, due to the second grid 33, extremely small portion of the electrons reaches the first grid 32. Most electrons are collected around the second grid 33. Thus, the electrons hit the first grid 32 and thus damage of the first grid 32 or heating-up rarely occurs or is prevented.

Accordingly, damage of the CNT 35, which is disposed below the first grid 32, can be minimized. It eventually leads to an improvement in the durability of the pressure sensor.

Second Embodiment

Figure 6:
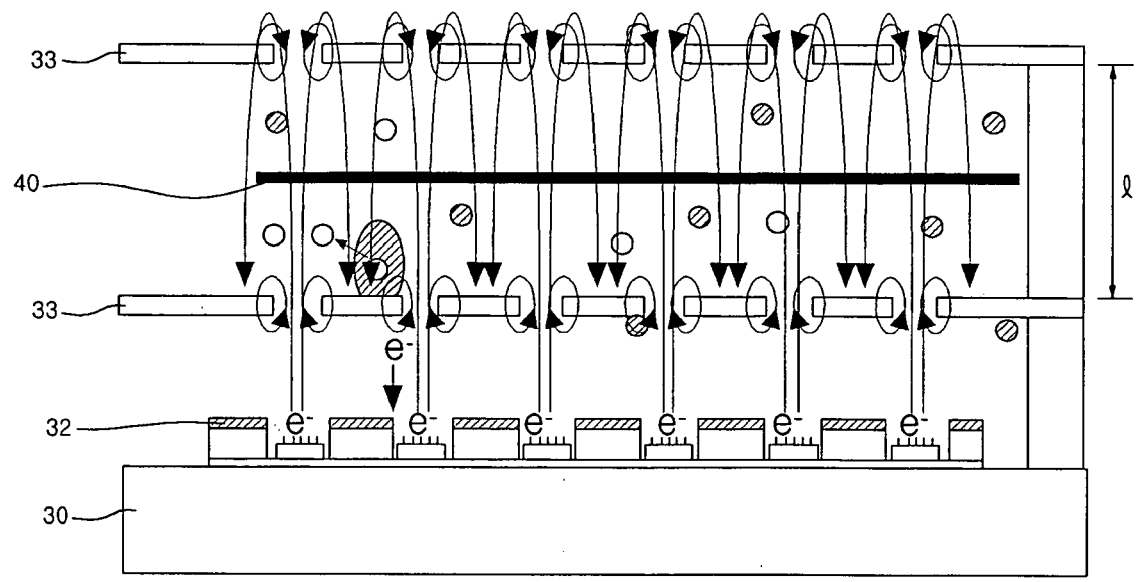
FIG. 6 is a schematic sectional view, when in use, of a pressure sensor using the field emission of a carbon nano-tube according to a second embodiment of the invention.
Figure 7:
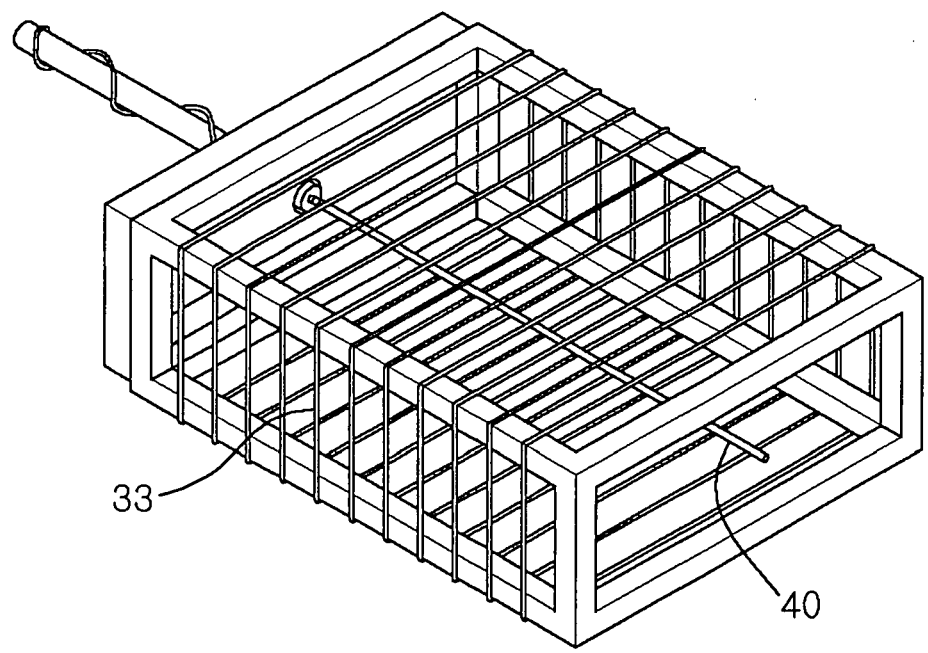
FIG. 7 is a perspective view of the pressure sensor of FIG. 6 where one collector is employed.
Figure 8:
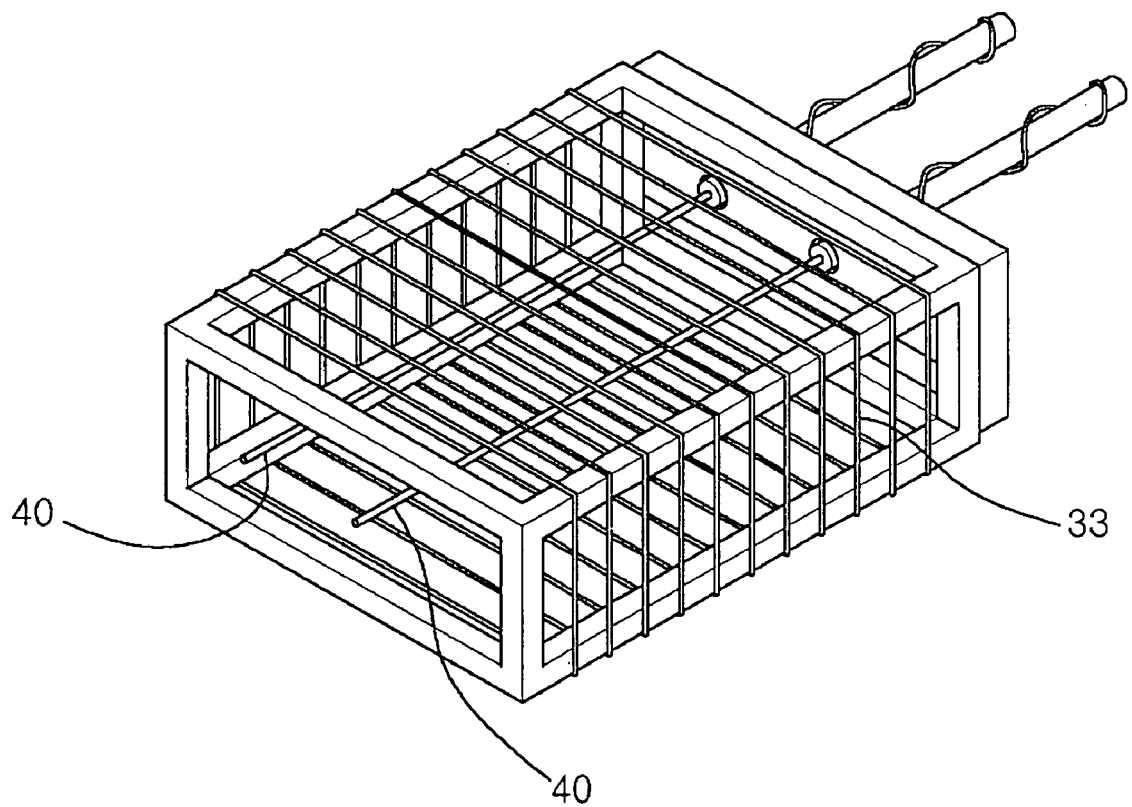
FIG. 8 is a perspective view of the pressure sensor of FIG. 6 where two collectors are employed.

FIG. 6 is a schematic sectional view, when in use, of a pressure sensor using the field emission of a carbon nano-tube according to a second embodiment of the invention. FIG. 7 is a perspective view of the pressure sensor of FIG. 6 where one collector is employed. FIG. 8 is a perspective view of the pressure sensor of FIG. 6 where two collectors are employed.

In the second embodiment of FIGS. 6 to 8, details on the same elements as in the first embodiment will not be repeated here, but refer to the previous explanations.

As illustrated in FIG. 6, the configuration of the glass substrate 30, the CNT and the first grid 32 is similar to that of the first embodiment.

A pair of second grids 33 is spaced apart by a distance l from each other and a collector 40 is disposed in-between. The voltages applied to each grid 32, 33 and the collector 40 are similar to the first embodiment. The collector has a mesh form in the first embodiment, but in the second embodiment has a wire form.

As illustrated in FIG. 6, a second grid 33 formed of a wire structure is disposed on the glass substrate 30 and the first grid 32, and a collector 40 formed of a wire structure is disposed thereon. In the case FIG. 8, collectors 40 parallel to each other are employed.

However, the specific configurations of FIGS. 6 to 8 illustrate one embodiment to explain the gist of the present invention. It should be noted that a configuration where a second grid 33 is disposed between a first grid 32 and the collector 40 is included in the scope of the invention.

In the second embodiment of FIGS. 5 to 8, the travelling path of electrons is extended to increase the probability of ionization. This means that a pressure measurement is enabled even against a high vacuum of an extremely diluted density of gas molecules 16.

The pressure sensor of the invention can perform a characteristic detection in a range of $10^{-7}$~0.01 Torr. In order to allow for a measurement in a range lower than $10^{-7}$ Torr., the amount of electron emission can be significantly increased, the distance between the grid and the collector can be considerably increased, or the collector structure can be modified.

Therefore, as described above, according to an embodiment of the invention, dissimilar to the conventional hot cathode ion gage, a relatively high vacuum can be measured. The present invention may be utilized as a pressure sensor having a good efficiency at a lower voltage.

In addition, a second grid is further provided to prevent damage of the CNT and thus improve its durability.

Further more, using an excellent field emission of a CNT, a high efficient and low-cost pressure sensor of a cold cathode ion gage type can be produced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A pressure sensor using a field emission of a carbon nano-tube, comprising:

an array of carbon nano-tubes formed on a metallic layer;

a first grid disposed on the array of the carbon nano-tubes;

a second grid disposed on the first grid such that the second grid is spaced apart by a first distance from the first grid; and a collector disposed on the second grid such that the collector is spaced apart by a second distance from the second grid, whereby electrons emitted from the carbon nano-tube are collided with gas molecules to be ionized forming an ionized cation, and the ionized cation is sensed by the collector to be outputted as an electrical signal.

2. The pressure sensor according to claim 1, wherein a first grid voltage Vg, a second grid voltage Vg' and a collector voltage Vc are applied to the first grid, the second grid and the collector respectively wherein Vc<Vg<Vg'.

3. The pressure sensor according to claim 1, wherein the collector comprises a mesh structure.

4. The pressure sensor according to claim 3, wherein the first grid comprises a mesh structure and the second grid comprises a mesh or wire structure.

5. The pressure sensor according to claim 1, wherein the collector comprises a wire structure.

6. The pressure sensor according to claim 5, wherein the first grid comprises a mesh structure and the second grid comprises a mesh structure.

7. The pressure sensor according to claim 5, wherein the first grid comprises a mesh structure and the second grid comprises a wire structure.

8. The pressure sensor according to claim 1, wherein a third grid is further installed on the collector, the third grid being spaced apart by a third distance from the collector.

9. The pressure sensor according to claim 8, wherein the collector comprises a wire structure.

10. The pressure sensor according to claim 9, wherein the collector includes one or two collectors.

11. The pressure sensor according to claim 9, wherein the third grid comprises a wire structure.

12. The pressure sensor according to claim 8, wherein the third grid, disposed above the collector, and the second grid, disposed below the collector, are applied with a same voltage Vg'.

* * * * *